US012326811B2

(12) United States Patent
Alden et al.

(10) Patent No.: US 12,326,811 B2
(45) Date of Patent: Jun. 10, 2025

(54) FAULT TOLERANT SYSTEMS AND METHODS USING SHARED MEMORY CONFIGURATIONS

(71) Applicant: STRATUS TECHNOLOGIES IRELAND LTD., Dublin (IE)

(72) Inventors: Andrew Alden, Leominster, MA (US); Chester Pawlowski, Burlington, MA (US); Christopher Cotton, Nashua, NH (US); John Chaves, Hudson, MA (US)

(73) Assignee: STRATUS TECHNOLOGIES IRELAND LTD. (IE)

( * ) Notice: Subject to any disclaimer, the term of this patent is extended or adjusted under 35 U.S.C. 154(b) by 0 days.

(21) Appl. No.: 18/072,297

(22) Filed: Nov. 30, 2022

(65) Prior Publication Data
US 2024/0176739 A1 May 30, 2024

(51) Int. Cl.
G06F 12/0815 (2016.01)
G06F 11/20 (2006.01)
G06F 12/0891 (2016.01)

(52) U.S. Cl.
CPC ...... *G06F 12/0815* (2013.01); *G06F 11/2025* (2013.01); *G06F 11/2028* (2013.01); *G06F 12/0891* (2013.01); *G06F 2212/1032* (2013.01)

(58) Field of Classification Search
None
See application file for complete search history.

(56) References Cited

U.S. PATENT DOCUMENTS 4,608,688 A 8/1986 Hansen et al.
6,355,991 B1 3/2002 Goff et al.
(Continued)

FOREIGN PATENT DOCUMENTS

CN 113608934 A * 11/2021

OTHER PUBLICATIONS

Kabemoto A et al: "The architecture of the Sure System 2000 communications processor", IEEE Micro, IEEE Service Center, Los Alamitos, CA, US, vol. 11, No. 4, Aug. 1, 1991 (Aug. 1, 1991), pp. 28-31, XP011417505, ISSN: 0272-1732, DOI: 10.1109/40.85724 (Year: 1991).

(Continued)

*Primary Examiner* — Kaushikkumar M Patel
(74) *Attorney, Agent, or Firm* — K&L GATES LLP

(57) ABSTRACT

In part, the disclosure relates to a fault tolerant system. The system may include one or more shared memory complexes, each memory complex comprising a group of M computer-readable memory storage devices; one or more cache coherent switches comprising two or more host ports and one or more downstream device ports, the cache coherent switch in electrical communication with the one or more shared memory storage device; a first management processor in electrical communication with the cache coherent switch; a first compute node comprising a first processor and a first cache, the first compute node in electrical communication with the one or more cache coherent switches and the one or more shared memory complexes; a second compute node comprising a second processor and a second cache, the second compute node in electrical communication with the one or more cache coherent switches and the one or more shared memory complexes.

21 Claims, 4 Drawing Sheets

(56) References Cited

U.S. PATENT DOCUMENTS

| | | |
|---|---|---|
| 6,633,996 B1 | 10/2003 | Suffin et al. |
| 6,687,851 B1 | 2/2004 | Somers et al. |
| 6,691,225 B1 | 2/2004 | Suffin |
| 6,691,257 B1 | 2/2004 | Suffin |
| 6,708,283 B1 | 3/2004 | Nevin et al. |
| 6,718,474 B1 | 4/2004 | Somers et al. |
| 6,766,413 B2 | 7/2004 | Newman |
| 6,766,479 B2 | 7/2004 | Edwards |
| 6,802,022 B1 | 10/2004 | Olson |
| 6,813,721 B1 | 11/2004 | Tetreault et al. |
| 6,842,823 B1 | 1/2005 | Olson |
| 6,862,689 B2 | 3/2005 | Bergsten et al. |
| 6,874,102 B2 | 3/2005 | Doody et al. |
| 6,886,171 B2 | 4/2005 | MacLeod |
| 6,928,583 B2 | 8/2005 | Griffin et al. |
| 6,948,010 B2 | 9/2005 | Somers et al. |
| 6,970,892 B2 | 11/2005 | Green et al. |
| 6,971,043 B2 | 11/2005 | McLoughlin et al. |
| 6,996,750 B2 | 2/2006 | Tetreault |
| 7,065,672 B2 | 6/2006 | Long et al. |
| 7,496,786 B2 | 2/2009 | Graham et al. |
| 7,496,787 B2 | 2/2009 | Edwards et al. |
| 7,669,073 B2 | 2/2010 | Graham et al. |
| 7,904,906 B2 | 3/2011 | Puthukattukaran et al. |
| 7,958,076 B2 | 6/2011 | Bergsten et al. |
| 8,117,495 B2 | 2/2012 | Graham |
| 8,161,311 B2 | 4/2012 | Wiebe |
| 8,234,521 B2 | 7/2012 | Graham et al. |
| 8,271,416 B2 | 9/2012 | Al-Biek et al. |
| 8,312,318 B2 | 11/2012 | Graham et al. |
| 8,381,012 B2 | 2/2013 | Wiebe |
| 8,589,723 B2 | 11/2013 | Kumar et al. |
| 8,812,907 B1 | 8/2014 | Bissett et al. |
| 9,251,002 B2 | 2/2016 | Manchek et al. |
| 9,588,844 B2 | 3/2017 | Bissett et al. |
| 9,652,338 B2 | 5/2017 | Bissett et al. |
| 9,760,442 B2 | 9/2017 | Bissett et al. |
| 10,216,598 B2 | 2/2019 | Haid et al. |
| 10,360,117 B2 | 7/2019 | Haid et al. |
| 11,288,143 B2 | 3/2022 | Horvath et al. |
| 11,586,514 B2 | 2/2023 | Pawlowski et al. |
| 2001/0042202 A1 | 11/2001 | Horrath et al. |
| 2002/0016935 A1 | 2/2002 | Bergsten et al. |
| 2002/0070717 A1 | 6/2002 | Pellegrino |
| 2003/0046670 A1 | 3/2003 | Marlow |
| 2003/0095366 A1 | 5/2003 | Pellegrino |
| 2004/0230861 A1 | 11/2004 | Bailey et al. |
| 2006/0117300 A1 | 6/2006 | Puthukattukaran et al. |
| 2006/0222125 A1 | 10/2006 | Edwards et al. |
| 2006/0222126 A1 | 10/2006 | Edwards et al. |
| 2006/0259815 A1 | 11/2006 | Graham et al. |
| 2006/0274508 A1 | 12/2006 | LaRiviere et al. |
| 2007/0011499 A1 | 1/2007 | Begsten et al. |
| 2007/0028144 A1 | 2/2007 | Graham et al. |
| 2007/0038891 A1 | 2/2007 | Graham |
| 2007/0106873 A1 | 5/2007 | Lally et al. |
| 2007/0174484 A1 | 7/2007 | Lussier et al. |
| 2009/0249129 A1 | 10/2009 | Femia |
| 2011/0213993 A1 | 9/2011 | Greenhalgh |
| 2012/0159245 A1 | 6/2012 | Brownlow et al. |
| 2015/0205688 A1 | 7/2015 | Haid et al. |
| 2015/0263983 A1 | 9/2015 | Brennan et al. |
| 2015/0370661 A1 | 12/2015 | Swanson et al. |
| 2016/0077937 A1* | 3/2016 | Inforzato ............ G06F 11/2028 714/4.11 |
| 2016/0098372 A1 | 4/2016 | Boyle et al. |
| 2017/0324609 A1 | 11/2017 | Hong et al. |
| 2018/0046480 A1 | 2/2018 | Dong et al. |
| 2018/0143885 A1 | 5/2018 | Dong et al. |
| 2019/0050302 A1 | 2/2019 | Juniwal et al. |
| 2020/0050523 A1* | 2/2020 | Pawlowski ......... G06F 11/2038 |
| 2021/0034447 A1 | 2/2021 | Horvath et al. |
| 2021/0034464 A1 | 2/2021 | Dailey et al. |
| 2021/0034465 A1 | 2/2021 | Haid et al. |
| 2021/0034483 A1 | 2/2021 | Haid |
| 2021/0034523 A1 | 2/2021 | Dailey |
| 2021/0037092 A1 | 2/2021 | Cao |
| 2022/0004468 A1* | 1/2022 | Willhalm .............. G06F 11/203 |
| 2022/0004488 A1* | 1/2022 | Paul .................... G06F 12/0607 |
| 2022/0374320 A1 | 11/2022 | Song .................. G06F 11/2028 |
| 2023/0017643 A1* | 1/2023 | Shah .................. G06F 13/1673 |
| 2023/0023229 A1* | 1/2023 | Kumar ................. G06F 3/0673 |
| 2023/0185681 A1 | 6/2023 | Pawlowski et al. |
| 2023/0291721 A1 | 9/2023 | Robinson |
| 2024/0069742 A1* | 2/2024 | McGee ................ G06F 11/203 |
| 2024/0080239 A1* | 3/2024 | Abate ................. H04L 41/0893 |
| 2024/0095186 A1* | 3/2024 | Waddington .......... G06F 12/121 |
| 2024/0176739 A1 | 5/2024 | Alden et al. |

OTHER PUBLICATIONS

Dong et al., "COLO: COarse-grain LOck-stepping Virtual Machine for Non-stop Service", SoCC'13, Oct. 1-3, 2013, Santa Clara, California, USA, ACM 978-1-4503-2428-1; 16 pages.

Dong et al., "COLO: COarse-grain LOck-stepping Virtual Machine for Non-stop Service", https://www.linux-kvm.org/images/1/1d/Kvm-forum-2013-COLO.pdf; 24 pages.

* cited by examiner

FAULT TOLERANT SYSTEMS AND METHODS USING SHARED MEMORY CONFIGURATIONS

FIELD

This disclosure relates generally to the field of fault tolerance in computing systems.

BACKGROUND

Contemporary computing systems with high availability requirements make use of resource redundancy and failover mechanisms for various purposes.

SUMMARY

In part, the disclosure relates to a fault tolerant system. The system may include one or more shared memory complexes, each memory complex comprising a group of M computer-readable memory storage devices; one or more cache coherent switches comprising two or more host ports and one or more downstream device ports, the cache coherent switch in electrical communication with the one or more shared memory storage device; a first management processor in electrical communication with the cache coherent switch; a first compute node comprising a first processor and a first cache, the first compute node in electrical communication with the one or more cache coherent switches and the one or more shared memory complexes; and a second compute node comprising a second processor and a second cache, the second compute node in electrical communication with the one or more cache coherent switches and the one or more shared memory complexes, wherein data stored in the one or more shared memory complexes by the first compute node and modified thereby because of operations executing on the first compute node is available for the second compute node to use and modify on a substantially real time basis in the event the second compute node takes over for the first node upon the first compute node undergoing a performance degradation event.

In some embodiments, the one or more cache coherent switches is one or more CXL switches. In various embodiments, the one or more cache coherent switches is one or more Cache Coherent Interconnect for Accelerator (CCIX) switches. In many embodiments, each of the M computer-readable memory storage devices is a DDR5 RAM module. In some embodiments, M is an integer greater than or equal to 1. In some embodiments, M is an even integer greater than or equal to 2. In some embodiments, the second compute node takes over for the active node upon the first node undergoing a performance degradation event during a failover time that ranges from about 1 millisecond to about 800 milliseconds. In various embodiments, the one or more CXL switches are in electrical communication with one or more secondary devices selected from the group consisting of a storage device, an I/O device, and an accelerator. In some embodiments, the system may further include a interconnect, the interconnect comprising one or more front-end interconnects and one or more back-end interconnects, wherein the one or more CXL switches are in electrical communication with the one or more back-end interconnects, wherein the first compute node and the second compute node are in electrical communication with the one or more front-end interconnects.

In some embodiments, the first cache comprises state information, wherein the first cache is configured to flush the state information to one or more of the M computer-readable memory storage devices in response to detection of a performance degradation event on the first compute node. In many embodiments, the one or more shared memory complexes is protected by one or more RAS features such as hardware, software or firmware systems implemented in the one or more cache coherent switches for memory recovery or error correction. In some embodiments, state information is accessible by the second compute node.

In various embodiments, the first compute node is executing an operating system and one or more customer applications. In many embodiments, the data associated with the one or more customer applications is accessible from the one or more shared memory complexes by the first compute node and the second compute node. In some embodiments, the second compute node takes over for the first compute node and continues to execute the one or more customer applications and modify the data associated with the one or more customer applications. In various embodiments, the first compute node is configured to generate a non-transparent bridging (NTB) window between a local memory of the first compute node and a local memory of the second compute node.

In part, the disclosure relates to a method of reducing recovery time in a fault tolerant system. The method includes providing a shared memory complex; providing a cache coherent switch in electrical communication with the shared memory complex, a first CPU node, a second CPU node and a primary management processor; upon occurrence of a performance degradation event, requesting permission for the first CPU node to failover to the second CPU node; signaling by the primary management processor that the second CPU node is able to serve as the standby node and take over for the first CPU node; messaging between first CPU node and second CPU node to transfer or support transfer of state from the failing first CPU node to the standby second CPU node; and flushing one or more caches of the first CPU node to the shared memory.

In some embodiments, the method may further include pausing direct memory access traffic from IO devices to the first CPU node. In various embodiments, the IO devices are selected from the group consisting of I/O, storage, and accelerators. In some embodiments, the method may further include avoiding copying local memory from the failing first CPU node to second CPU node, wherein the second CPU node is transitioning to become an active node. In many embodiments, the permission is requested of the primary management processor. In various embodiments, the method may further include the second CPU node taking over for the first CPU node upon the first CPU node undergoing a performance degradation event during a failover time that ranges from about 1 millisecond to about 800 milliseconds.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation. Further, the various CPU nodes, PCIe devices, PCIe switches, Compute Express Link (CXL) devices, CXL switches, various complexes, CXL complexes, Cache Coherent Interconnect for Accelerator (CCIX) devices, memory complex, random access memory, non-volatile FLASH memory, persistent memory, memory devices, accelerators, RAS (Reliability, Availability and Serviceability) systems, methods, software and hardware for memory protection and error correction, backplanes, midplanes, interconnects, data paths, I/O devices, caches, management CPUs, bridges, buses, network devices, interfaces, NVMe devices, disks, and parts of the foregoing disclosed herein can be used and shared with each other in various combinations and any other devices and systems without limitation.

These and other features of the applicant's teachings are set forth herein.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which.

DETAILED DESCRIPTION

Figure 1:
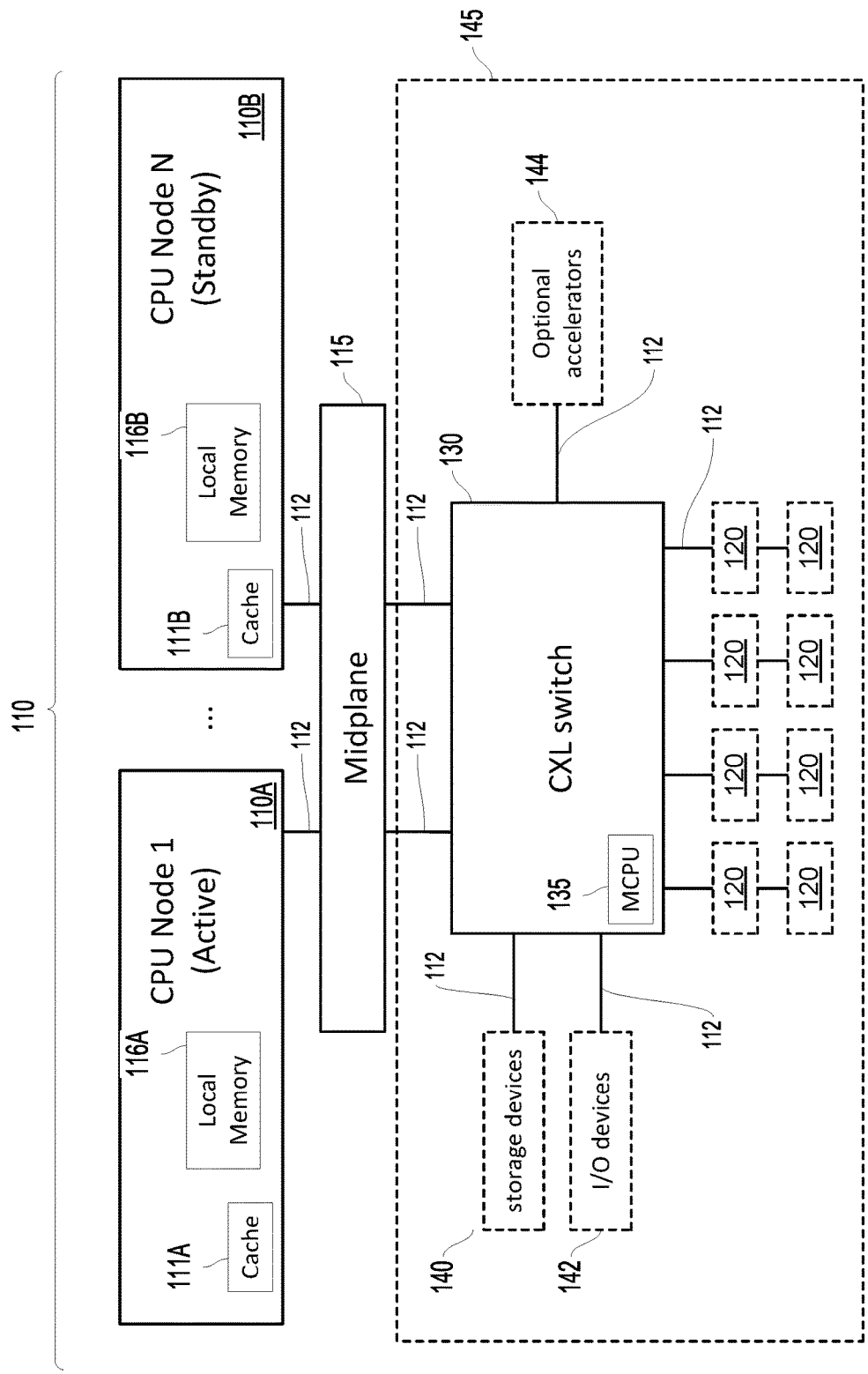
FIG. 1 is a high-level block diagram of a system implementing a shared memory complex accessible by multiple CPUs via a cache coherent switch, such as a compute express link (CXL) switch wherein the switch enables rapid CPU and memory state failover according to an exemplary embodiment of the disclosure.

In part, the disclosure relates to a fault tolerant computer system that implements CPU and memory state failover using a shared memory configuration. In one aspect, the disclosure relates to a shared memory architecture that uses a cache coherent interconnect, switch or fabric configured to electrically couple or connect processors, accelerators, network interface devices and storage devices with each other and/or a share group or complex of memory devices such as an array of random-access memory or other memory modules as appropriate for a given use case.

In computer systems, processor, memory and related component failures can result in an interruption of application and system operations. Current technologies and techniques used to avoid such interruptions are not always effective or may not be fast enough to avoid an application or system outage. Furthermore, systems with expensive components such as accelerators are not typically replicated and migrating memory state for an accelerator requires significant time and consumes power. Additionally, even without accelerators, migrating memory state for a conventional processor can itself require significant time and consumption of power.

In some embodiments of the method of CPU and memory state failover disclosed herein, multiple CPU nodes share a memory complex such that, when one CPU node experiences a correctable error, warning/failure indicator, or other performance degradation event, the CPU node experiencing the error may be replaced with a new CPU node connected to the same shared memory. The memory state of the replaced CPU node, already present in the shared memory, need not be copied to a new memory complex. In various embodiments, memory may be individual memory devices, pairs of memory devices, or other combinations of memory devices. In some embodiments, memory interleaving is supported.

In various embodiments disclosed herein, a fault tolerant computer system uses at least one cache coherent device or switch such as, for example, a compute express link (CXL) switch or a Cache Coherent Interconnect for Accelerator (CCIX) switch to manage a low-latency memory complex shared among CPU nodes. In some embodiments, low latency may refer to a delay or latency that ranges from about 10 to about 100 nanoseconds. In other embodiments, low latency may reference to a delay that ranges from about 4 to about 500 nanoseconds. The management of the shared low-latency memory complex using the CXL switch can include memory writes, memory reads, resolution of memory addressing conflicts between compute nodes using the memory complex as their primary random access memory and changing which compute nodes may access memory modules within the memory complex.

In various embodiments, the memory complex facilitates the exchange of data between cooperating CPU nodes and provides a very fast CPU failover solution with N+1 redundancy protection against CPU failures. In various embodiments, the CPU failover time is very fast in the sense that the failover time may ranges from about 1 millisecond to about 800 milliseconds. Such a failover solution improves application availability and may eliminate a time to copy a memory of one failing CPU to a replacement CPU that may be required in other failover strategies. The memory copy step may be avoided by the replacement CPU using the memory of the failing CPU by directly using the contents of the memory modules previously written to by the failing CPU. In various embodiments, caches are flushed back to the shared memory. In some embodiments, the architectural internal registers, which constitute part of the running operating system and application state, from the processor are migrated. One or more save/restore functions available for processors may be used in various embodiments to save state from original active node, copy state to the standby node, and/or restore state on the standby node which is about to become the new active.

For example, to recover from a CPU or other hardware failure, some applications may tolerate an application restart with some loss of data that was memory-resident at the time of a crash or other hardware or application failure. In such cases, an application restart may be part of a cost-effective failover solution. However, an application restart will incur a significant time cost to reload application data from storage to the original processor, accelerator, or memory complex, or to a spare CPU node available to replace the failed CPU node. The use of a shared memory complex and a CXL switch dramatically improves upon legacy approaches because of the significantly reduced time it takes to resume the application following an outage.

Other failover solutions, in the case of CPU failure, may migrate CPU state from one physical node to another, supporting both 'bare metal' and virtualized operating systems. Such solutions may require a substantial time to copy memory and state from one CPU node to another as well as a non-negligible period in which all applications are paused. The time in which applications are paused may be unacceptable to certain applications with stringent, sub-second, real-time responsiveness requirements. As noted herein, use of a shared memory complex and a CXL switch dramatically improves upon fault tolerant systems that rely on pausing applications and that otherwise have time delays associated with memory copies.

In most embodiments of the current disclosure, the running state of an active node also referred to herein as active CPU node or active computer node is substantially stored in a shared memory complex. As such, if this node fails, the time required to copy the state of the failed node to a new node is eliminated. The failing node simply flushes its caches so that the state of the node is completely contained in the shared memory complex. After the state of the failed node is available in shared memory, the failing node may take final steps to transfer its role as an active node to a replacement node.

In some embodiments, the systems are configured for the selective use of unutilized or otherwise idle components, components that are in a standby state, or components available as replacements to failing components. The foregoing components may be selectively controlled and used or quiesced or otherwise taken off line as applicable for a given application or failure or error event.

In some embodiments, by decoupling the processor and memory subsystem, various fault tolerant system embodiments of the disclosure enable/allow a faster powering down the idle processor. In some embodiments, memories may be self-refreshed before powering down the processor (known as S3 state). In most embodiments, the memory is not available to other processors when in self-refresh.

Finally, in most embodiments of the current disclosure, the failover architecture allows CPU and I/O nodes (such as hot-pluggable/swappable assemblies containing one or more I/O devices) to be replaced independently as examples of serviceable nodes. This modular functionality that allows for components to be swapped or replaced independently improves serviceability relative to other hyperconverged infrastructure (HCI) solutions, i.e. solutions embodying a seamless combination of compute, storage, networking, and data services in a single physical system running virtualized or containerized workloads.

Refer now to the exemplary embodiment of FIG. 1, wherein a fault tolerant computer system includes N CPU nodes 110 connected via a interconnect 115 to a single compute express link (CXL) switch 130 that multiplexes a plurality of memory modules 120. In many embodiment, various data paths 112 may be used to electrically connect components or otherwise couple components such that they are in electrical communication. Data paths 112 may include without limitation, buses, traces, cables, conductive paths, electrical connections, optical connections, and other paths suitable for transmitting data and/or electrical signals. In various embodiments, in the figures, the various components depicted may be connected by one or more data paths shown by solid lines and/or lines with arrows.

In some embodiments, interconnect 115 is a midplane or midplane interconnect. In various embodiments, interconnect 115 includes one or more devices that supports boards plugging in from both sides, a backplane with boards plugging in from just one side, or a set of cables or data paths. A first CPU node, CPU Node 110A is shown and the last of the CPU nodes is CPU Node N 110B. In various embodiments, N is a positive integer greater than or equal to 2.

In various embodiments, a given node of the N CPU nodes such as node 110A and/or 110B may optionally include local memory such as local memory 116A, 116B shown in FIG. 1. In various embodiments, a non-transparent bridging (NTB) window or other memory transfer mechanism between a local memory 116A of the first CPU node and a local memory 116B of the second CPU node may be generated from either the node 110A or node 110B. The various computer nodes described herein may, optionally, have one or more local memories.

The interconnect 115 has a frontend that connects to the CPU nodes 110A, 110B and a backend that connects to the CXL switch 130. Memory modules 120 may include RAM memory, computer readable memory, Double Data Rate memory module such as a Double Data Rate Synchronous Dynamic Random-Access Memory, persistent memory and other high speed, low power consumption memory. In various embodiments, any suitable memory standard suitable to the application and other components in the fault tolerant system may be used in the memory module. In various embodiments, a group of memory modules such as the eight shown in FIG. 1 may be treated together as a group or a series of subgroups and classified as memory complex. In some embodiments, one or more memory complexes are used with one or more CXL switches.

In some embodiments, the CXL switch may also connect storage devices 140, I/O devices 142, or optional accelerators 144 to the CPU nodes. In various embodiments, the systems and methods disclosed herein provide support for accelerators 144 that connect to one or more CXL switches in addition to memory. A plurality of CPU nodes 110A is in an active state while at least one remaining node 110B is in a standby state. In addition to the shared memory modules 120, each CPU node has a memory cache 111A, 111B in which a portion of a CPU node's state may be stored. Finally, the CXL switch 130 may include or be in communication with a management CPU (MCPU)/management processor which may run firmware that coordinates and assists with failover functions. In various embodiments, the CXL switch 130 is one of a plurality of CXL switches that may be connected in various configurations. In some embodiments of cache coherent switches, the management processor may be external to the switch. In various embodiments, the management processor is a functional unit within the switch hardware itself.

In various embodiments, collections of components or individual components may be replaceable such as a modular component to support serviceability. These various components may be integrated on a shared board or bus and configured to be removed as a collection or has individual connections for interfacing with a given system. In some embodiments, such a components or a collection of components may be referred to as a serviceable node or serviceable component. A given serviceable node may also include individual serviceable components in some embodiments. As an example, a serviceable node 145 includes some, all or subset of the components shown below the midplane 115 in FIG. 1. A given serviceable node may be replaceable, swappable, hot swappable, hot pluggable and configurable. Another example of serviceable nodes are shown by serviceable nodes 225a and 225b in FIG. 2. In some embodiments, various memory individual memory modules or combinations of memory modules may be serviceable nodes such as serviceable nodes 221 of FIG. 2.

In many embodiments, an active CPU node, such as CPU node 111A, that is experiencing correctable errors, failure indicators, or other performance degradation events that may lead to a system outage can be quickly failed-over to a healthy standby node, such as CPU node N 110B, with minimal application interruption and no user intervention. The faulty CPU node is isolated and can undergo diagnostics to determine its health and either become the new standby node or remain isolated and be marked for replacement.

In various embodiments, to replace the failing active CPU node, the replacement standby CPU node inherits the state of the failing active CPU node. The state of the failing active node consists substantially of the memory accessible by that node: its cache 111A and primary memory 120. In most embodiments, the memory modules 120 are accessible by both the failing active node 110A and the replacement node 110B via the CXL switch 130 and therefore no additional time or process is required to transfer memory 120 between the failing active node and the replacement node. However, in many embodiments, the cache 111A of the failing active node contains a portion of the state of the failing active node, and so to complete the replacement of the failing node, the cache of the failing active node is first flushed to a memory module 120 that is part of the shared memory accessed by the CXL. As a result, the flushed cache information or state is immediately available to the standby or replacement node 110B.

Figure 2:
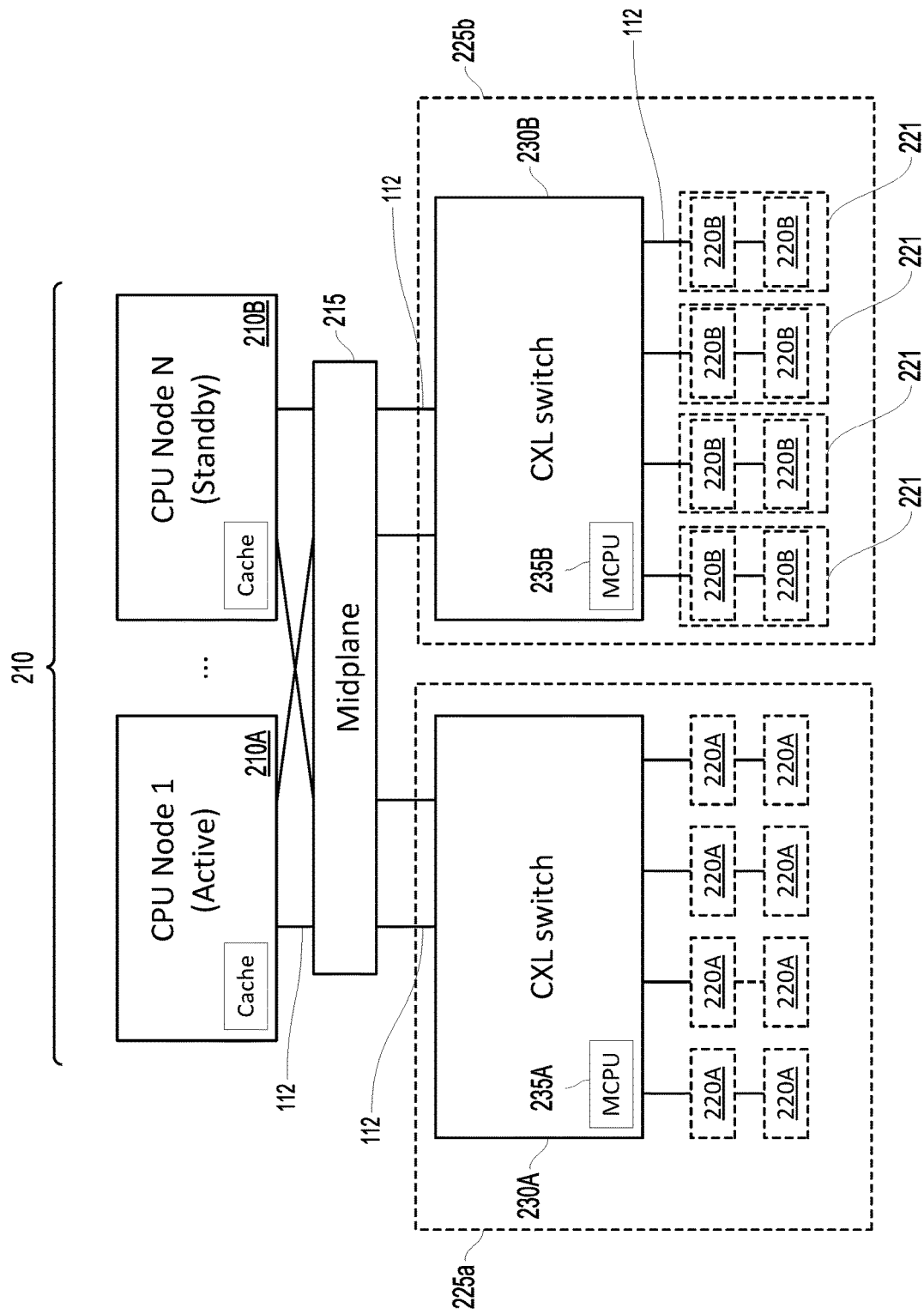
FIG. 2 is a high-level block diagram of a system implementing a two memory complexes, each accessible by multiple CPUs via a cache coherent switch, such as a CXL switch, according to an exemplary embodiment of the disclosure.

Refer now to the exemplary embodiment of FIG. 2, wherein a fault tolerant computer system includes N CPU nodes 210 connected via an interconnect 215 to two CXL switches 230A, 230B. The two CXL switches 230A, 230B provide distinct collections of memory modules 220A, 220B to each CPU node via a interconnect 215. The interconnect 215 has a frontend that connects to the CPU nodes 210A, 210B and a backend that connects to the switches 230A, 230B.

In some embodiments, each CXL switch contains its own MCPU 235A, 235B. In embodiments containing a plurality of CXL switches, one MCPU will be chosen by software supporting the failover solution as a Primary MCPU, a central point for communication between active and standby compute nodes. In some embodiments, a plurality of CXL switches is used to support modular replaceability during compute mode operation in the event one of the CXL switches fail. In some embodiments, the memory contents of memory modules 220A may be mirrored to memory modules 220B via the two switches 230A, 230B.

Figure 3:
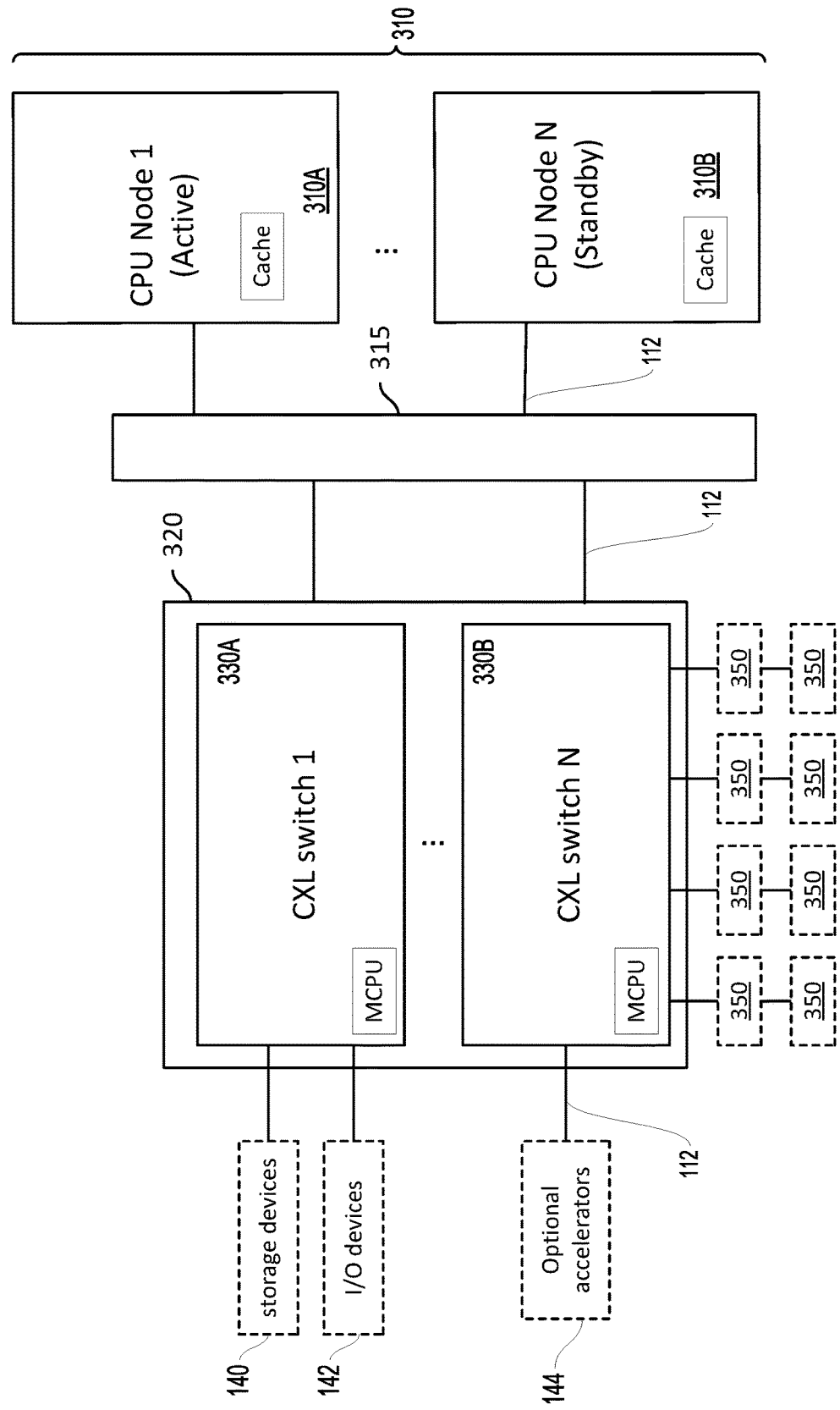
FIG. 3 is a high-level block diagram of a system implementing a complex of a cache coherent switches, such as a CXL switches, to mediate a memory complex, storage devices, I/O devices, and accelerators according to an exemplary embodiment of the disclosure.

Next, refer to the alternative embodiment of FIG. 3, wherein a fault tolerant computer system includes N CPU nodes 310 connected via a interconnect 315 to CXL switching complex 320. The CXL switching complex 320 contains a plurality of CXL switches 330A, 330B accessible by a plurality of active CPU nodes and at least one standby CPU node. The switching complex 320 is also in electrical communication with a group of memory modules 350. The systems depicted in FIG. 1, FIG. 2, and FIG. 3 and described, are example embodiments through and in, which the failover solution disclosed herein may be implemented. The systems of FIGS. 1 and 2 may also use a CXL switching complex 320 in lieu of individual CXL switches in various embodiments. In some embodiments, the CXL switching complex 320 may also connect storage devices 340, I/O devices 342, or optional accelerators 344 to the CPU nodes 310.

In most embodiments, a compute node or CPU node in a fault tolerant computer system is a compute complex containing: a processor of x86 or other architecture and an integrated or discrete platform controller with supporting logic, including voltage regulators, clocks, etc.

In some embodiments, a fault tolerant computer system of CPU nodes connected to at least one memory complex accessible via a CXL switch is equipped with a PCIe switching fabric. In some embodiments, a PCIe switching fabric may be used for I/O devices such as network controllers, storage devices, etc. The various I/O devices may or may not be directly connected to the cache coherent CXL switch.

In many embodiments, a management CPU (MCPU) may coordinate or assist in various aspects of a failover, a swap of a failing active CPU and a standby CPU. In one embodiment, an MCPU is a PCIe fabric switch processing agent that is capable of snooping, intercepting, redirecting, and synthesizing PCIe transactions within the switch domain. In many embodiments, during a failover, a fault tolerant computer system may enter a system management mode (SMM), suspending operating system control, as a failing active CPU is replaced by a standby CPU.

In most embodiments, original driver software of various devices in a fault tolerant computer system may be modified to support operations that will effectively quiesce and then resume I/O operations. Such a quiesce and resume function provides a window in which the final memory copies may be performed absent of further modifications and I/O resources may be switched from the active to standby node.

In some embodiments, driver software modifications may vary depending on driver software base, operating system capabilities, or device capabilities. In some embodiments, driver software modifications may include processing of new input/output controls (IOCTLs) or may incorporate existing device management capabilities. Modifications of driver software may allow completion of 'in-flight' transactions and forestall further operations or allow a quiescent device to resume operation. In some embodiments, drivers will make use of processor or switch features such as Downstream Port Containment (DPC) to signal detection of errors according to an industry standard and isolate the IO device(s) from which the error originated from the rest of the system. Finally, driver software supports dirty page tracking of all I/O DMA operations, although this function may not be needed if all memory allocated for I/O device DMA is in the shared memory space.

In various embodiments, a CPU node in a standby state may run a limited but suitably robust operating environment, including, for example, a BIOS or minimal unified extensible firmware interface (UEFI)—an API of low-level routines that are available for execution in privileged contexts—software stack or a minimal Linux operating system. In one embodiment, this limited operating environment may provide local CPU diagnostics and error handling facilities.

In other embodiments, the limited operating environment may also include a synthetic PCI hierarchy—a PCIe fabric switch technology that allows multiple hosts connected to the same switch see mutually exclusive sets of PCI functions—provided by the PCIe fabric MCPU. In other embodiments, the limited operating environment may handle the creation and management of NTB window spaces to enable CPU to CPU communication, as well as the processing of commands passed through the NTB window(s). In still other embodiments, the limited operating environment of a standby CPU node may provide ACPI management services, system management interrupt (SMI) handling, and system management mode (SMM) state management.

In some embodiments, a standby node may be quiesced, placed in an idle mode, turned off, and/or replaced. In other embodiments, the limited operating environment of the standby CPU node may leverage PCI management functions and/or hardware to quiesce the standby CPU and resume operation out of hibernation as the active CPU. In most embodiments, CPU nodes in an active state run an OS and applications in either a virtualized or non-virtualized environment.

In many embodiments, such as the embodiments of FIG. 1, FIG. 2, or FIG. 3, if one of: a failure, a beginning of a failure, or a predicted failure occurs in an active CPU node, termed the failing active CPU node, a CPU node in a standby state, termed the replacement standby CPU node, may transition into an active state to replace the failing active CPU node. This transition from a failing CPU to a standby CPU is typically accompanied by the failing CPU node flushing any cached memory locations back to the shared physical memory to allow access by the new active node, even when the failing node is reset, powered down or removed for a service operation.

In various embodiments, flushing the cache of the failing node to a shared memory module or complex makes the existing processor state of the failing node available to the standby node that will take over, using the state information and the other data stored in the shared memory. The various embodiments described herein avoid the use of software to track memory pages which are modified by the operating system or customer application(s) during a memory copy operation (termed brownout copy, to indicate that the application is still running, but performance may be affected by the memory copy, which will consume some memory and I/O bandwidth) such as through dirty memory page tracking through the use of shared memory and the CXL switch. In various embodiments, the cache will be updated as a natural consequence of reading memory. No special action needs to be taken on the standby node with respect to caching data from the shared memory. In some embodiments, the system resets or clears the cache before connecting the standby node to shared memory. In various embodiments, one or more steps are performed to remove or replace any stale data in the cache.

Figure 4:
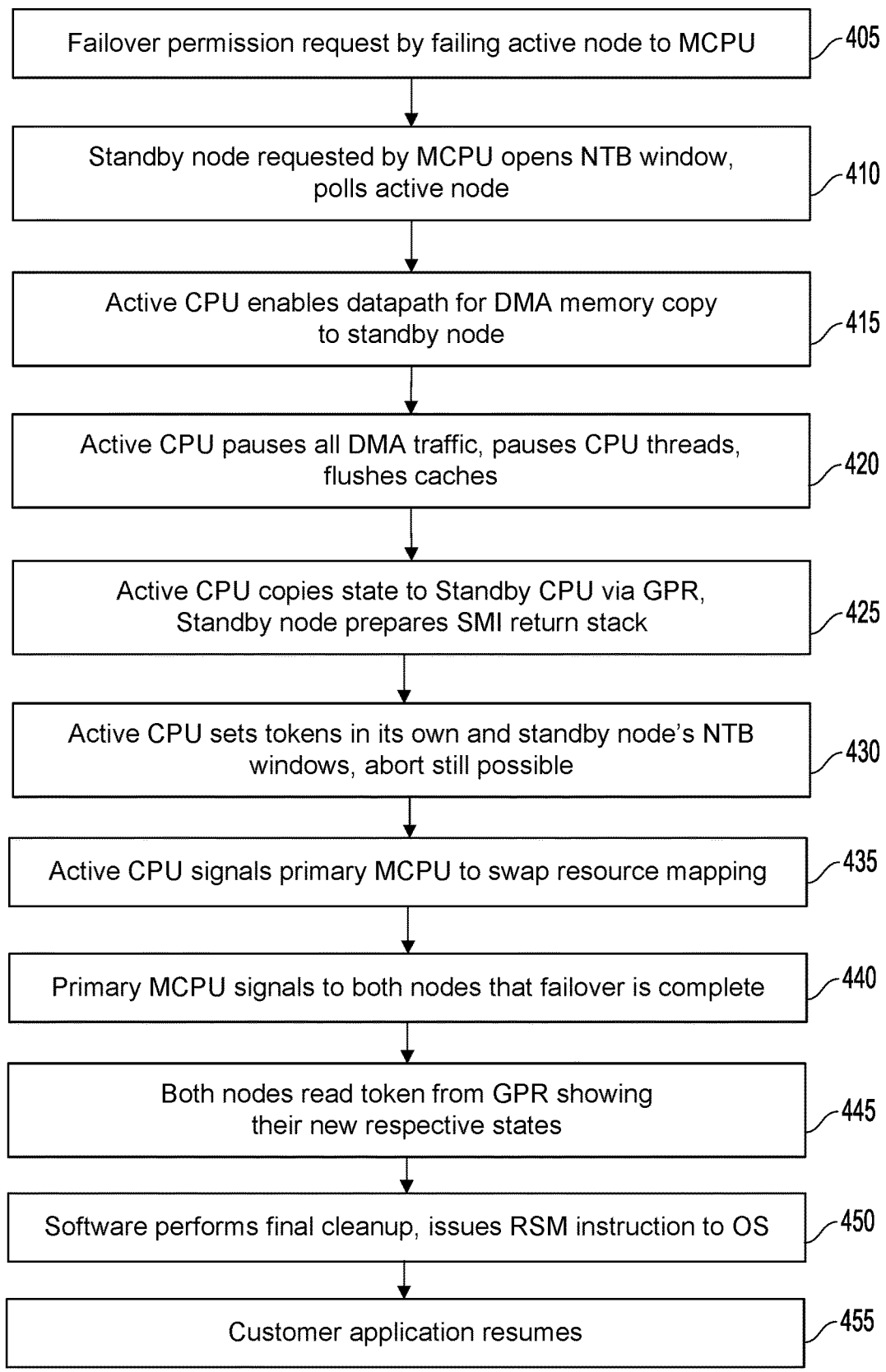
FIG. 4 is a flow chart depicting one type of failover process according to an exemplary embodiment of the disclosure.

Refer now to the exemplary embodiment of FIG. 4, wherein a flow chart depicting the failover process is illustrated. First, an active CPU which is experiencing correctable errors or degraded capability or other performance degradation events or indicators may request permission 405 for failover from the Primary MCPU. At least one standby node, normally running diagnostics, may be in a state ready to take over the role of the failing active CPU. Standby nodes may also be maintained in a powered-down, quiesced, paused, or offline state and then spun up or powered on to be brought into a state ready to take over the role of the failing active CPU.

In various embodiments, the state of the failing active node may be reflected in the shared memory multiplexed by a CXL switch, in various caches local to the active CPU, or in various registers local to the active CPU. In most embodiments, replication of the state of a failing active CPU into a replacement standby CPU may involve flushing of local CPU caches into shared memory, and registers local to the replacement standby CPU by saving internal registers from the failing active node and copying them to an area on the standby CPU or shared memory, and then restoring them to the internal registers on the replacement CPU node. In some embodiments, flushing the cache of the failing active CPU node and subsequently swapping roles of the failing active and replacement standby nodes incur a 'blackout' time for application execution. In these embodiments, during blackout, all system workload is paused while the final steps of the state copy are completed.

In one embodiment, after a failover request occurs, a standby node ready to take over the role of the failing active CPU is signaled 410 by the MCPU and in response will enable a non-transparent bridging (NTB) window—a PCIe technology that creates a point-to-point connection between two memory systems though PCI memory-mapped I/O (MMIO) space-into its memory and begin polling the failing active node for commands that will replicate the state of the failing active CPU into the replacement standby CPU. The replacement standby node signals its status to the failing active node and the failing active node enables a datapath 415 for direct memory access DMA memory copy. In various embodiments, the memory copy includes a copying of the internal registers. Copying of the internal registers may be performed DMA, or by Memory Mapped IO transactions (MMIO), which may be faster than setting up a DMA engine, if the number of registers to be copied is small. In some embodiments, the system switches the main paths from IO devices to direct them to the replacement CPU node. In some embodiments, in its current state, the replacement standby CPU cannot initiate read or write access to the memory of the failing active CPU.

The failing active CPU signals its hardened drivers to pause all DMA traffic 420, indicating a beginning of a blackout phase. CPU threads are all corralled, paused, isolated and/or segregated to prevent further dirtying of cacheable memory pages, i.e., so that the most up-to-date cache may be flushed. All processor internal caches on the failing active node are then flushed back to the shared memory. Any memory written in the shared memory by an application executing on the failing active CPU remains in the shared memory for use by the standby CPU node that is going to take over the role of active CPU node.

Upon completion of the cache flush, the failing active CPU may copy its state 425 to the replacement standby CPU through the general-purpose register (GPR) protocol. In some embodiments, a reserve region of shared memory is used for copying operations. In some embodiments, the CPU state copied may include model-specific registers (MSRs), local advanced programmable interrupt controller (APIC) state data, high precision event timer (HPET) state data, or other state data. The state is copied into the corresponding registers on the standby CPU.

Next, the failing active CPU sets tokens 430 in its own NTB window and the NTB window of the replacement standby CPU such that both nodes know their intended new states after the failover operation. At any time up through this step, the failover could be aborted, and operation would simply continue on the original active CPU. In some embodiments, tokens are instructions, flags, states or operations that perform a role identifying function so that each node knows its role at different steps in the failover process, and allows the system to change or revert a role assignment or operation if system needs to abort the failover.

To complete the failover, if all steps up to this point have been completed successfully, the failing active CPU sends a command to the primary MCPU to swap all the resource mapping 435 between the host ports for the two CPUs which are participating in the failover operation. In this step, the primary MCPU coordinates with any secondary MCPUs to handle error cases.

The primary MCPU signals 440 to the failing active and replacement standby CPUs when the switch reconfiguration is complete. In some embodiments, the switch reconfiguration may include changing the routing of any devices in communication with the PCIe and CXL switches to connect them to the replacement node rather than the failing active.

In many embodiments, the reconfiguration operates to redirect all, substantially all, or some traffic to the host port for the new active CPU node. Both CPUs then read tokens 445 from their GPRs showing their new respective states. By now, the CPU that was termed the 'failing active' CPU is actually in the standby state and the CPU that was termed the 'replacement standby' CPU is in the active state, the latter CPU having assumed the role of the former.

Finally, software performs any final cleanup and post-processing required 450. Post-processing may include, for example, replaying of enumeration cycles to train the CXL switch how to map transactions from the new host. Software also executes a resume from system management mode (RSM) instruction to restore register contents from a stack in memory and return control to the operating system. Drivers that were signaled to quiesce their devices before the failover are now signaled to resume operation. In turn, the customer application resumes 455.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

In most embodiments, a processor may be a physical or virtual processor. In other embodiments, a virtual processor may be spread across one or more portions of one or more physical processors.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within +20% of a target value in some embodiments, within +10% of a target value in some embodiments, within +5% of a target value in some embodiments, and yet within +2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

The use of headings and sections in the application is not meant to limit the disclosure; each section can apply to any aspect, embodiment, or feature of the disclosure. Only those claims which use the words "means for" are intended to be interpreted under 35 USC 112, sixth paragraph. Absent a recital of "means for" in the claims, such claims should not be construed under 35 USC 112. Limitations from the specification are not intended to be read into any claims, unless such limitations are expressly included in the claims.

Embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a computer program product embodied in one or more computer readable medium(s) having computer readable program code embodied thereon.

Unless specifically stated otherwise as apparent from the following discussion, it is appreciated that throughout the description, discussions utilizing terms such as "processing" or "computing" or "calculating" or "delaying" or "comparing", "generating" or "determining" or "forwarding or "deferring" "committing" or "interrupting" or "handling" or "receiving" or "buffering" or "allocating" or "displaying" or "flagging" or Boolean logic or other set related operations or the like, refer to the action and processes of a computer system, or electronic device, that manipulates and transforms data represented as physical (electronic) quantities within the computer system's or electronic devices' registers and memories into other data similarly represented as physical quantities within electronic memories or registers or other such information storage, transmission or display devices.

The algorithms presented herein are not inherently related to any particular computer or other apparatus. Various general purpose systems may be used with programs in accordance with the teachings herein, or it may prove convenient to construct more specialized apparatus to perform the required method steps. The required structure for a variety of these systems is apparent from the description above. In addition, the present disclosure is not described with reference to any particular programming language, and various embodiments may thus be implemented using a variety of programming languages.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The examples presented herein are intended to illustrate potential and specific implementations of the present disclosure. The examples are intended primarily for purposes of illustration of the disclosure for those skilled in the art. No particular aspect or aspects of the examples are necessarily intended to limit the scope of the present disclosure.

The figures and descriptions of the present disclosure have been simplified to illustrate elements that are relevant for a clear understanding of the present disclosure, while eliminating, for purposes of clarity, other elements. Those of ordinary skill in the art may recognize, however, that these sorts of focused discussions would not facilitate a better understanding of the present disclosure, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present disclosure, a single component may be replaced by multiple components, and multiple components may be replaced by a single component, to perform a given function or functions. Except where such substitution would not be operative to practice embodiments of the present disclosure, such substitution is within the scope of the present disclosure. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present disclosure. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C #, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity.

Unless otherwise indicated, all numbers expressing lengths, widths, depths, or other dimensions and so forth used in the specification and claims are to be understood in all instances as indicating both the exact values as shown and as being modified by the term "about." As used herein, the term "about" refers to a ±10% variation from the nominal value. Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques. Any specific value may vary by 20%.

The invention may be embodied in other specific forms without departing from the spirit or essential characteristics thereof. The foregoing embodiments are therefore to be considered in all respects illustrative rather than limiting on the disclosure described herein. The scope of the invention is thus indicated by the appended claims rather than by the foregoing description, and all changes which come within the meaning and range of equivalency of the claims are intended to be embraced therein.

It will be appreciated by those skilled in the art that various modifications and changes may be made without departing from the scope of the described technology. Such modifications and changes are intended to fall within the scope of the embodiments that are described. It will also be appreciated by those of skill in the art that features included in one embodiment are interchangeable with other embodiments; and that one or more features from a depicted embodiment can be included with other depicted embodiments in any combination. For example, any of the various components described herein and/or depicted in the figures may be combined, interchanged, or excluded from other embodiments.

What is claimed is:

1. A fault tolerant computer system comprising:
    one or more shared memory complexes, each memory complex comprising a group of M computer-readable memory storage devices;
    one or more cache coherent switches comprising two or more host ports and one or more downstream device ports, the cache coherent switch in electrical communication with the one or more shared memory complexes;
    a first management processor in electrical communication with the cache coherent switch, the management processor comprising firmware configured to coordinate and assist with one or more failover functions;
    an interconnect comprising one or more front-end interconnects and one or more back-end interconnects, wherein the one or more cache coherent switches are in electrical communication with the one or more back-end interconnects,
    a first compute node comprising a first processor and a first cache, the first compute node in electrical communication with the one or more cache coherent switches and the one or more shared memory complexes, the first compute node configured to run an operating system and a customer application; and
    a second compute node comprising a second processor and a second cache, the second compute node in electrical communication with the one or more cache coherent switches and the one or more shared memory complexes,
    wherein the first compute node and the second compute node are in electrical communication with the one or more front-end interconnects,
    wherein data stored in the one or more shared memory complexes by the first compute node and modified thereby because of operations executing on the first compute node is available for the second compute node to use and modify on a substantially real time basis in the event the second compute node takes over for the first node upon the first compute node undergoing a performance degradation event, wherein the management processor is configured to signal that the second compute node is able to serve as the standby node and take over for the first compute node using the firmware, wherein the second compute node runs the operating system and the customer application after a failover time.

2. The system of claim 1 wherein the one or more cache coherent switches is one or more CXL switches.

3. The system of claim 1 wherein the one or more cache coherent switches is one or more Cache Coherent Interconnect for Accelerator (CCIX) switches.

4. The system of claim 1 wherein each of the M computer-readable memory storage devices is a DDR5 RAM module.

5. The system of claim 1 wherein the second compute node takes over for the active node upon the first node undergoing a performance degradation event during a fail over time that ranges from about 1 millisecond to about 800 milliseconds.

6. The system of claim 2 wherein the one or more CXL switches are in electrical communication with one or more secondary devices selected from the group consisting of a storage device, an I/O device, and an accelerator.

7. The system of claim 2 wherein the first cache comprises state information, wherein the first cache is configured to flush the state information to one or more of the M computer-readable memory storage devices in response to detection of a performance degradation event on the first compute node.

8. The system of claim 2 wherein the one or more shared memory complexes is protected by one or more RAS features such as hardware, software or firmware systems implemented in the one or more cache coherent switches for memory recovery or error correction.

9. The system of claim 6 wherein state information is accessible by the second compute node.

10. The system of claim 2 wherein the first compute node is executing an operating system and one or more customer applications.

11. The system of claim 10 wherein the data associated with the one or more customer applications is accessible from the one or more shared memory complexes by the first compute node and the second compute node.

12. The system of claim 8 wherein the second compute node takes over for the first compute node and continues to execute the one or more customer applications and modify the data associated with the one or more customer applications.

13. The system of claim 2 wherein the first compute node is configured to generate a non-transparent bridging (NTB) window between a local memory of the first compute node and a local memory of the second compute node.

14. The system of claim 1, wherein the management processor is a PCIe fabric switch processing agent that is configured to process PCIe transactions within a domain of one or more cache coherent switches.

15. A method of reducing recovery time in a fault tolerant system, the method comprising:
providing an integrated fault tolerant system comprising
a shared memory complex,
a cache coherent switch in electrical communication with the shared memory complex, a first CPU node, and
a second CPU node and a primary management processor;
upon occurrence of a performance degradation event, requesting permission for the first CPU node to failover to the second CPU node;
signaling by the primary management processor that the second CPU node is able to serve as the standby node and take over for the first CPU node;
messaging between first CPU node and second CPU node to transfer or support transfer of state from the failing first CPU node to the standby second CPU node; and
flushing one or more caches of the first CPU node to the shared memory.

16. The method of claim 15 further comprising pausing direct memory access traffic from IO devices to the first CPU node.

17. The method of claim 16 wherein the IO devices are selected from the group consisting of I/O, storage, and accelerators.

18. The method of claim 15 further comprising avoiding copying local memory from the failing first CPU node to second CPU node, wherein the second CPU node is transitioning to become an active node.

19. The method of claim 15 wherein the permission is requested of the primary management processor.

20. The method of claim 15 further comprising the second CPU node taking over for the first CPU node upon the first CPU node undergoing a performance degradation event during a failover time that ranges from about 1 millisecond to about 800 milliseconds.

21. The method of claim 15, wherein the primary management processor is a PCIe fabric switch processing agent that is configured to process PCIe transactions within a domain of one or more cache coherent switches.

* * * * *